D. KUPFER.
MACHINE FOR CUTTING PLASTIC MATERIALS.
APPLICATION FILED SEPT. 8, 1919.
1,380,723.
Patented June 7, 1921.
2 SHEETS—SHEET 1.
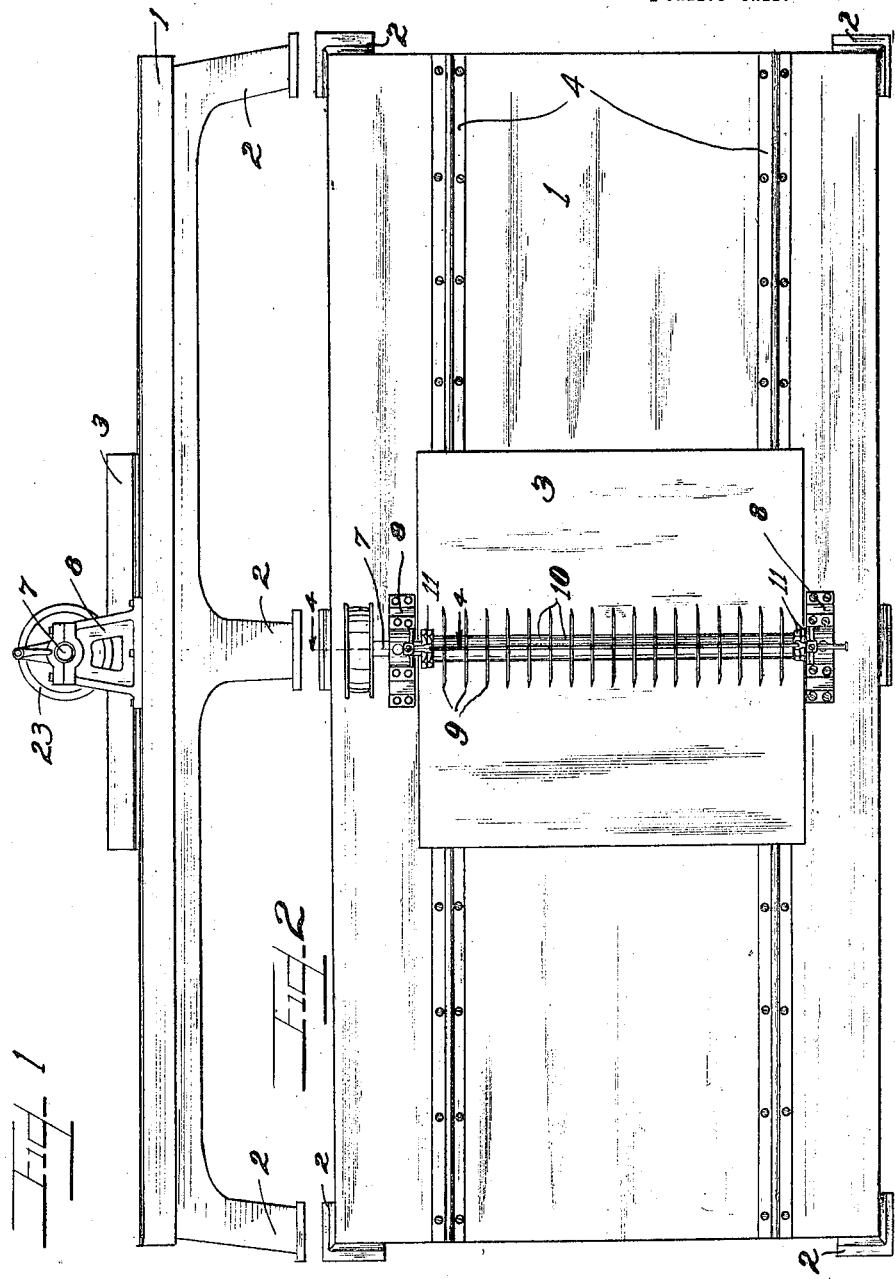
Witnesses
Maurice M. Jackson.
Le Roy D. Riley.
Inventor
David Kupfer
by Charles W. Tilley
Atty.

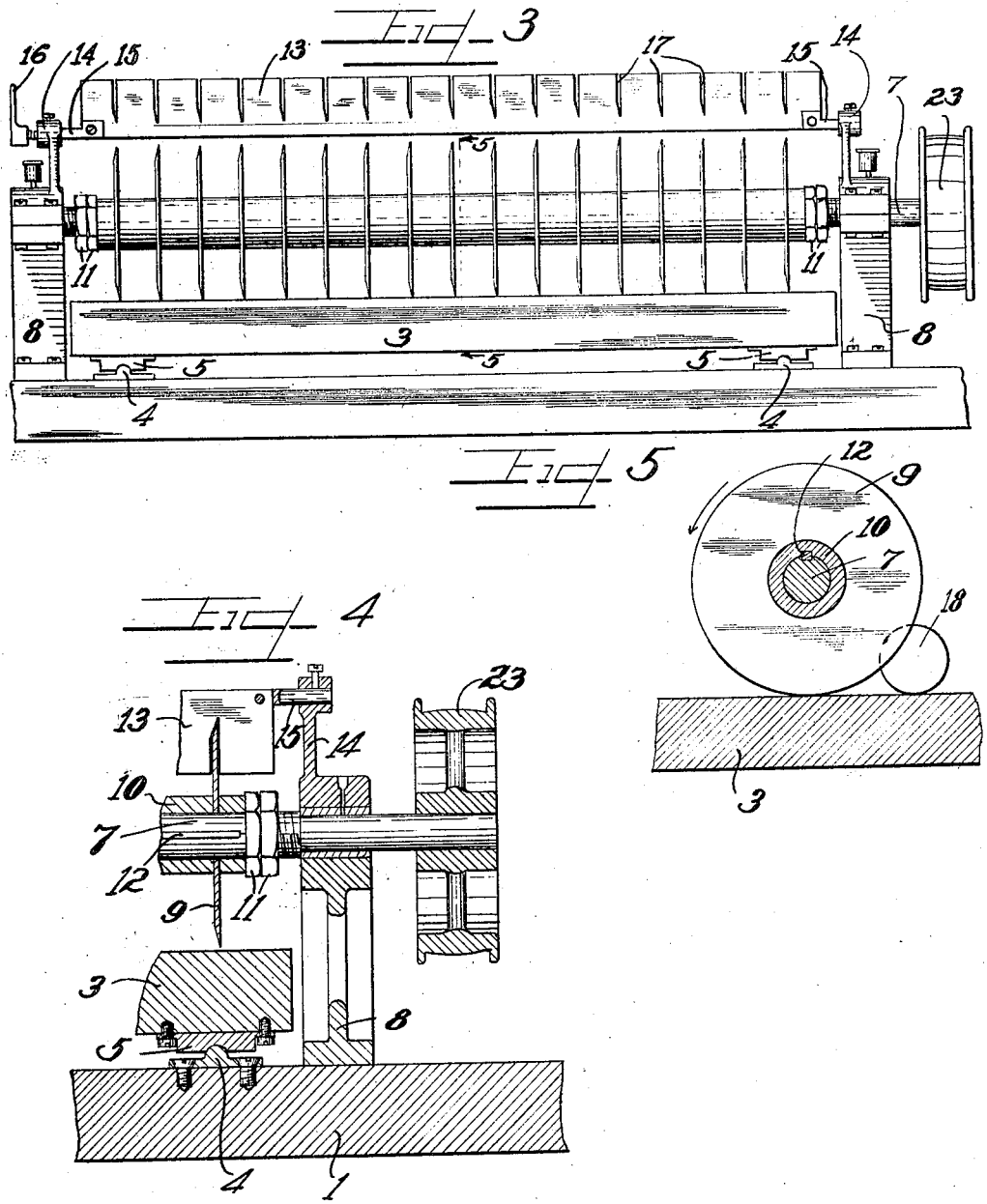

UNITED STATES PATENT OFFICE.

DAVID KUPFER, OF CHICAGO, ILLINOIS.

MACHINE FOR CUTTING PLASTIC MATERIALS.

1,380,723. Specification of Letters Patent. Patented June 7, 1921.

Application filed September 8, 1919. Serial No. 322,394.

*To all whom it may concern:*

Be it known that I, DAVID KUPFER, a citizen of the United States, and a resident of the city of Chicago, in the county of Cook and State of Illinois, have invented certain new and useful Improvements in Machines for Cutting Plastic Materials; and I do hereby declare that the following is a full, clear, and exact description of the same, reference being had to the accompanying drawings, and to the numerals of reference marked thereon, which form a part of this specification.

This invention relates to machines and processes for cutting plastic materials and, although not restricted to such use, is particularly adapted for the cutting of cream employed in the manufacture of chocolate creams.

Heretofore the cream has been cut and molded entirely by hand, which consumes very considerable time. Further, it is difficult to cut the cream by hand since the knife must be moved very rapidly through the cream to prevent the latter sticking to it.

It is an object, therefore, of the present invention to provide a machine and process for cutting plastic materials.

A further object of the invention is to provide means for passing sheets, strips or rolls of plastic material beneath a series of cutting disks rotated at high speed.

Other and further important objects of this invention will be apparent from the disclosures in the specification and drawings.

The invention (in a preferred form) is illustrated in the drawings and hereinafter more fully described.

On the drawings:

Figure 1 is a side elevation of a machine embodying the features of the present invention.

Fig. 2 is a plan view of the same.

Fig. 3 is an end elevation of the same.

Fig. 4 is a section on the line 4—4 of Fig. 2.

Fig. 5 is a section on the line 5—5 of Fig. 3.

As shown in the drawings:

The machine comprises a platform 1 conveniently supported by legs 2. On this platform a table 3 is arranged, adapted to slide to and fro therealong. For guiding this table suitable guiding means may be provided such as rails 4, adapted to engage grooves in plates 5 secured to the under side of the table 3.

Extending transversely above the platform is a shaft 7 journaled in bearings 8, secured to the platform and adapted to be driven by a pulley wheel 23. Along this shaft are arranged a series of cutting disks 9, spaced apart by collars 10 of the desired width. Lock nuts 11 threaded onto the shaft 7 clamp the disks and collars together so as to prevent any lateral play. Rotation of the collars and disks on the shaft may be prevented in any convenient way such as by means of a key 12. The shaft is arranged at such a height that the edges of the disks almost contact with the top of the table 3, so that the disks will cut through any material thereon.

Although there is little tendency for the material to adhere to the disks if they are driven at high speed, means may advantageously be provided for cleaning the disks while in rotation. For this purpose a comb 13 is pivotally mounted by lugs 15 on brackets 14 extending upwardly from the bearings 8. To the end of one of these lugs 15 a handle 16 is attached so that the comb may be turned from the position shown in Fig. 3 to that shown in Fig. 4, so as to bring the disks 9 in engagement with the slots 17 in the comb.

The operation is as follows:

In the process of making lumps of cream to be dipped in chocolate it is usual to form the cream into long rolls as shown at 18. These rolls 18 are then laid transversely on the table 3, which is then slid under the disks 9, while the latter are rotating at a high rate of speed. In Fig. 5 one of these rolls 18 is shown as it is leaving the disks 9 after being divided into a series of short cylinders. Evidently the machine may be employed for cutting squares from a sheet of material by first cutting the sheet into strips, then turning these strips through 90° and then subdividing the strips.

I am aware that numerous details of construction may be varied through a wide range without departing from the principles of this invention, and I therefore do not purpose limiting the patent granted otherwise than necessitated by the prior art.

I claim as my invention:

A device of the kind described comprising a support, a table movable at various rates of speed along tracks on the support, a series of rotatable disks above the table for cutting tacky plastic material resting on the table as the latter is traversed beneath said disks, means for rotating the disks at a high rate of speed relative to the speed of the table movement, and means for cleaning said disks pivoted above the disks and adapted to be locked out of operative position.

In testimony whereof I have hereunto subscribed my name in the presence of two subscribing witnesses.

DAVID KUPFER.

Witnesses:
 Le Roy D. Kiley,
 Earl M. Hardine.